Oct. 10, 1944. E. G. WHIPPLE 2,359,954
TRIMMING TOOL
Filed Aug. 5, 1943
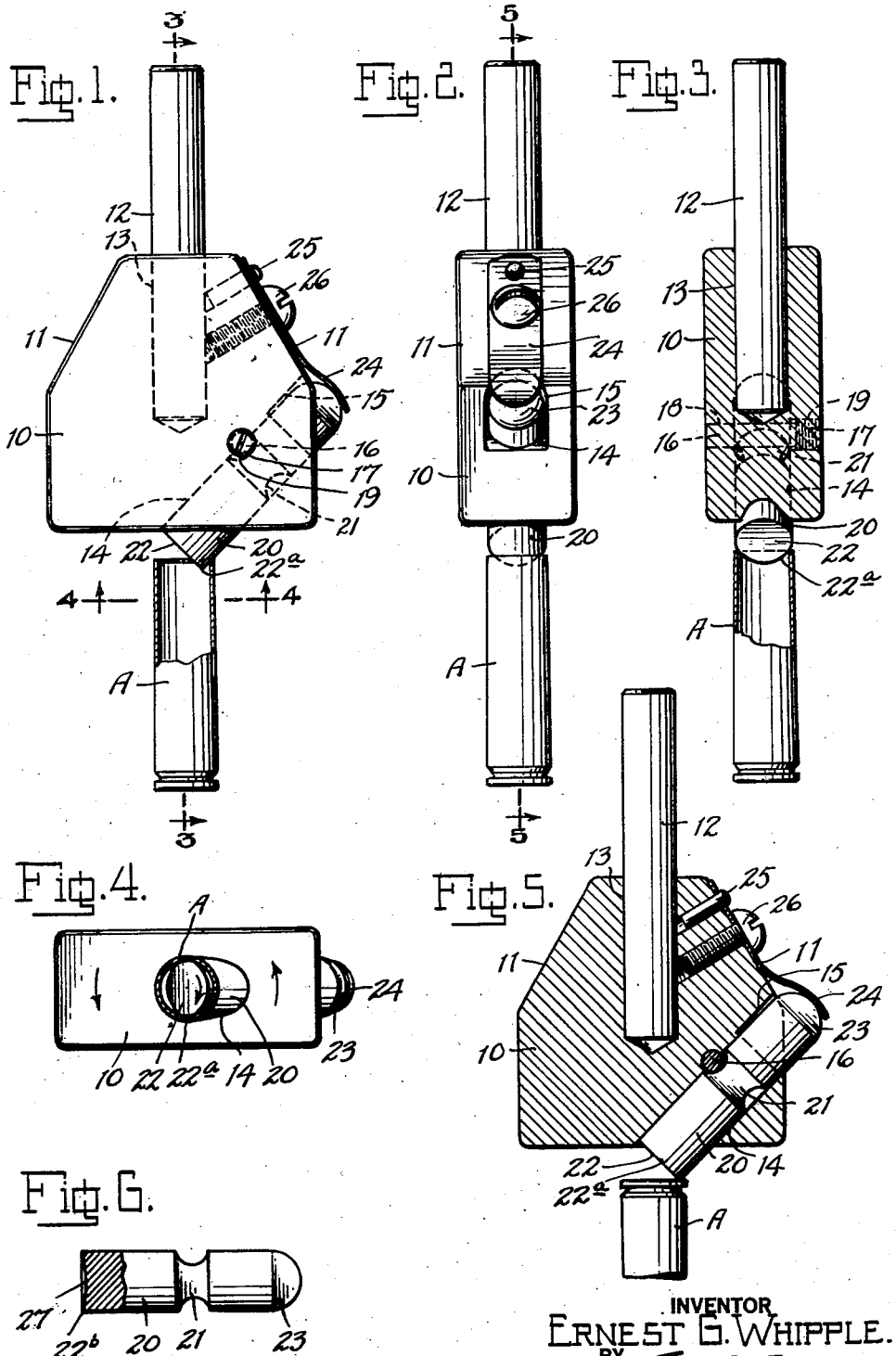
INVENTOR
ERNEST G. WHIPPLE.
BY
ATTORNEYS Patented Oct. 10, 1944

2,359,954

UNITED STATES PATENT OFFICE 2,359,954

TRIMMING TOOL

Ernest G. Whipple, Stratford, Conn., assignor to Remington Arms Company, Inc., Bridgeport, Conn., a corporation of Delaware Application August 5, 1943, Serial No. 497,450

8 Claims. (Cl. 29—105)

The present invention relates to an improvement in trimming tools, particularly for engaging within the open end of a tubular object, as for instance the mouth end of a cartridge shell, to chamfer its inner edge or to remove the burr therefrom. With tools heretofore in use scratches were apt to be produced, the clearance or relief provided upon the tool for scrap caused looseness between the tool and the work piece, resulting in unevenness in the depth of the cut around the circumference of the work piece, and the fixed setting of such tools produced greater or less depth in the cut depending upon the tolerance variation in the length of the article. These tools required frequent resharpening and resetting, especially when working upon hard metal, such as steel, and there was a constant change in the cutting edge due to the fact that the work-engaging point of the cutting edge was constant and would begin to wear at its cutting point as soon as the tool was put into operation.

It is an object of the present invention to provide a trimming tool which will obviate these disadvantages, and to this end it is proposed to provide a tool element which is self-centering and self-supporting within the mouth of the article to be trimmed, and wherein the depth of cut can be readily controlled through predetermined spring pressure applied to the tool, and irrespective of tolerance variations in the length of the article.

A further object is to provide a trimming tool adapted to produce a uniform cut around the circumference of the article, and whereby scratching, either on the inside or outside of the article, is prevented, the engaging edge of the tool being automatically confined to the inner edge of the mouth of the article.

Articles such as cartridges shells are closed at their head end, and may upon occasion enter the trimming machine in inverted position with the head end up, and in the past this has resulted in damage to the tool, as well as mutilation of the article. It is a further object of the present invention to provide a trimming tool having a yieldable mounting whereby it will yield upon engagement with an unintended surface, such as the head end of the cartridge shell, without damage to the tool.

A further object is to provide a cutting tool wherein the cutting edge is produced by the intersection of a cylindrical surface and a flat or hollow ground face disposed in a plane at 90° to the axis of the cylinder, and whereby uniform and accurate sharpening may be carried out conveniently and quickly simply by the grinding of the face. It is further proposed to mount the cylindrical tool, with its axis at an angle, as for instance 45°, to and intersecting the vertical axis of the work piece.

A further object is to provide a cutting tool rotatably mounted within its holder and adapted to rotate at a differential slower speed than the speed of rotation of the holder, whereby there is a constant change of the points of engagement of the cutting edge with the work thereby preventing excessive wear at any one point.

With the above and other objects in view, an embodiment of the invention is shown in the accompanying drawing, and this embodiment will be hereinafter more fully described with reference thereto, and the invention will be finally pointed out in the claims.

In the drawing:

Fig. 1 is a front elevation of a trimming tool, according to the illustrated exemplary embodiment of the invention, the same being shown in its operative relation with the open mouth end of a cartridge shell.

Fig. 2 is a side elevation.

Fig. 3 is a vertical transverse sectional view, taken along the line 3—3 of Fig. 1.

Fig. 4 is a bottom plane view, the cartridge shell being shown in horizontal section along the line 4—4 of Fig. 1.

Fig. 5 is a vertical longitudinal sectional view, taken along the line 5—5 of Fig. 2, and showing the trimming tool in a retracted position engaged by the head end of an inverted cartridge shell.

Fig. 6 is a side elevation, partially in section, of a modified form of tool having a hollow ground face.

Similar reference characters indicate corresponding parts throughout the several figures of the drawing.

Referring to the drawing, the trimming tool, according to the illustrated exemplary embodiment of the invention, comprises a tool holder head or body member 10 of rectangular block form having the upper portions of its end walls inclined upwardly and inwardly to the top wall, as at 11—11, a vertical shaft 12 being secured by a press fit within a pocket 13 extending downwardly from its upper face in coaxial relation to the vertical axis of the tool and adapted to be secured within the rotatable spindle of the trimming machine, this spindle being mounted for vertical reciprocation to bring the tool into and out of relation with the work piece. The work piece is illustrated by way of example as a cartridge shell A, a succession of such shells adapted to be intermittently fed beneath the tool in coaxial relation therewith by a suitable reciprocating feed which rigidly supports the lower end of the shell during the trimming operation.

The head 11 is provided in its lower portion with a diagonal passage 14 of cylindrical form, having its axis in the vertical central longitudinal plane of the head, and preferably disposed at a 45° angle to the vertical axis of the head, the lower end of this passage terminating in the horizontal lower face of the head with its axis preferably intersecting this lower face at a point offset from the vertical axis of the head, so that the axis of the tool carried within the passage 14 intersects the vertical axis of the head at a point spaced below the lower face of the head. At its upper end the passage is provided with a shouldered relatively larger diameter clearance portion 15, cylindrical at its upper side and cut away into rectangular form at its lower side to meet the vertical side wall of the head, this clearance portion serving to feed lubricant to the tool. Intermediate the ends of the passage 14 the head is provided with a transverse tool retaining cross-pin 16 provided with a screw threaded head 17, the end of the pin being engaged in a transverse passage 18 at one side and the threaded head being engaged in a threaded passage 19 at the other side, this pin intersecting the upper side of the passage 14 in spaced relation above its axis.

The trimming tool 20 is of cylindrical form to engage within the passage 14 for rotational and longitudinal sliding movement, being provided intermediate its ends with an annular recess 21 engaged by the cross-pin 16 and of relatively greater width than the cross-pin to permit of limited longitudinal movement of the tool in the passage. The face 22 of the tool is ground flat, in a plane at 90° to the axis of the tool, and the intersection of this flat face with the cylindrical surface provides a circumferential cutting edge 22a, which in the normal operative position of the tool has its major portion disposed below the horizontal lower face of the head with the central axis of the face approximately intersected by the vertical axis of the head. The upper end of the tool is spherically formed as at 23, and projects outwardly from the side wall of the head, where it is engaged by a pressure leaf spring 24, positioned upon the upper inclined surface 11 of the head by means of a dowel pin 25 and secured thereon in tensioned relation by means of a screw 26, the angle of this spring being such as to exert projecting pressure upon the tool substantially along its longitudinal axis, the projected position being limited through engagement with the cross-pin 16. By predetermining the tension of the spring 24 the resistance of the tool to axial pressure thereon to retract it is controlled, this control determining accurately the depth of cut upon the article, as will presently more fully appear.

In operation the work piece, as for instance the cartridge shell A, is fed into position beneath the rotating tool which thereupon moves downwardly into engagement with the mouth of the shell, the diameter of the tool being predetermined with respect to the dimension of the particular work piece so that the engagement of the cutting edge within the mouth is at opposite points along a cord line slightly less than the diameter of the tool, and substantially as shown in Figs. 1 to 4. Upon first engagement with the work the tool yields outwardly, and thereupon through rotation of the head it trims the mouth to chamfer it or to remove burrs, the cutting action being in the nature of a scraping operation performed by the sharp circumferential edge of the tool disposed at substantially a 45° angle to the mouth surface, the depth of cut being determined by the pressure of the spring upon the tool. During the cutting operation the resistance between the tool and the work piece causes the tool to rotate relatively to the rotating head, in the direction indicated by the arrows in Fig. 4, at a substantially reduced speed with respect to the speed of the head, and hence there is a constant change in the point of engagement of the cutting edge with the work piece, preventing wearing at any one point and resulting in a uniformity of cutting action over a relatively long period of use before regrinding becomes necessary.

In Fig. 5 there is illustrated the condition which results when a cartridge shell is inadvertently fed into the machine with its head end up. In this case the tool will yield upwardly as the head moves downwardly toward the work, and no damage will result in the tool, such as has resulted in the case of rigidly mounted tools. A substantially similar yielding of the tool will result in the case of a shell having a malformed or out-of-round mouth.

In Fig. 6 there is illustrated a modified form of tool, wherein the face 27 is hollow ground, this type of face resulting in a cutting edge 22b having a sharper angle with the cylindrical surface.

The form of the invention illustrated in the drawing and described herein is typical and illustrative only, and it is evident that the invention is capable of embodiments in other forms, all falling within the scope of the appended claims, which are to be broadly construed.

What is claimed is:

1. In a tool, a rotatable holder, and a tool element rotatably supported in said holder for rotational movement relative to an axial line inclined downwardly and inwardly to the rotational axis of said holder and having a circumferential work-engaging edge in a plane normal to said axial line and intersected by the rotational axis of said holder, said work-engaging edge adapted to engage within the open end of a tubular article disposed coaxially with the rotational axis of said holder.

2. In a tool, a rotatable holder, a tool element supported in said holder for longitudinal movement relative to an axial line inclined downwardly and inwardly to the rotational axis of said holder and having a work-engaging edge in a plane inclined to and intersected by the rotational axis of said holder, and spring means carried by said holder engaged with said tool element to exert projecting pressure thereon, said work-engaging edge adapted to engage within the open end of a tubular article disposed coaxially with the rotational axis of said holder.

3. In a tool, a rotatable holder, and a tool element supported in said holder for longitudinal and rotational movement relative to an axial line inclined downwardly and inwardly to the rotational axis of said holder and having a circumferential work-engaging edge in a plane normal to said axial line and intersected by the rotational axis of said holder, said work-engaging edge adapted to engage within the open end of a tubular article disposed coaxially with the rotational axis of said holder.

4. In a tool, a rotatable holder, a tool element supported in said holder for longitudinal and rotational movement relative to an axial line inclined downwardly and inwardly to the rotational axis of said holder and having a circumferential work-engaging edge in a plane normal to said axial line and intersected by the rotational axis of said holder, and spring means carried by said holder engaged with said tool element to exert projecting pressure thereon, said work-engaging edge adapted to engage within the open end of a tubular article disposed coaxially with the rotational axis of said holder.

5. In a tool, a rotatable holder, a tool element supported in said holder for longitudinal and rotational movement relative to an axial line inclined downwardly and inwardly to the rotational axis of said holder and having a circumferential work-engaging edge in a plane normal to said axial line and intersected by the rotational axis of said holder, spring means carried by said holder engaged with said tool element to exert projecting pressure thereon, and stop means cooperating between said holder and tool element to limit the relative longitudinal movement of said tool element, said work-engaging edge adapted to engage within the open end of a tubular article disposed coaxially with the rotational axis of said holder.

6. In a tool, a rotatable holder having a cylindrical tool-receiving passage therein having its longitudinal axial line inclined downwardly and inwardly to and intersecting the rotational axis of said holder, and a cylindrical tool element engaged in said passage for relative rotational and longitudinal movement therein and having a circumferential work-engaging edge in a plane normal to its longitudinal axial line and intersected by the rotational axis of said holder, said work-engaging edge adapted to engage within the open end of a tubular article disposed coaxially with the rotational axis of said holder.

7. In a tool, a rotatable holder having a cylindrical tool-receiving passage therein having its longitudinal axial line inclined downwardly and inwardly to and intersecting the rotational axis of said holder, a cylindrical tool element engaged in said passage for relative rotational and longitudinal movement therein and having a circumferential work-engaging edge in a plane normal to its longitudinal axial line and intersected by the rotational axis of rotation of said holder, said tool element having an annular groove intermediate its ends, spring means carried by said holder engaged with said tool element to exert projecting pressure thereon, and a retaining cross pin carried by said holder engaging said annular groove of said tool element to limit its relative longitudinal movement, said work-engaging edge adapted to engage within the open end of a tubular article disposed coaxially with the rotational axis of said holder.

8. In a tool for trimming the inner mouth edge of a cartridge shell, a rotatable holder, a tool element supported in said holder for longitudinal and rotational movement relative to an axial line inclined downwardly and inwardly to and intersecting the rotational axis of said holder and having a circumferential mouth trimming edge in a plane normal to said axial line and intersected by the rotational axis of said holder, said trimming edge adapted to engage within the mouth end of the cartridge shell disposed coaxially with the rotational axis of said holder.

ERNEST G. WHIPPLE.